US009489735B1

(12) United States Patent
Reitmayr

(10) Patent No.: US 9,489,735 B1
(45) Date of Patent: Nov. 8, 2016

(54) MULTIPLEXED TEMPORAL CALIBRATION FOR EVENT-BASED CAMERAS

(71) Applicant: QUALCOMM Incorporated, San Diego, CA (US)

(72) Inventor: Gerhard Reitmayr, Vienna (AT)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 14/857,277

(22) Filed: Sep. 17, 2015

(51) Int. Cl.
*G06T 7/00* (2006.01)
*H04N 17/00* (2006.01)
*H04N 9/31* (2006.01)

(52) U.S. Cl.
CPC ......... *G06T 7/0018* (2013.01); *H04N 9/3164* (2013.01); *H04N 17/002* (2013.01); *G06T 2207/10004* (2013.01); *G06T 2207/30244* (2013.01)

(58) Field of Classification Search
USPC .................. 348/188, 187, 180, 181, 177
See application file for complete search history.

(56) References Cited

U.S. PATENT DOCUMENTS

| | | | |
|---|---|---|---|
| 6,753,828 B2 | 6/2004 | Tuceryan et al. | |
| 7,224,386 B2 | 5/2007 | Kang et al. | |
| 7,750,969 B2 * | 7/2010 | Sato | G01B 11/2504 348/187 |
| 2008/0031610 A1 * | 2/2008 | Border | H04N 5/23212 396/89 |
| 2008/0095468 A1 * | 4/2008 | Klemmer | H04N 9/3194 382/285 |
| 2008/0123937 A1 * | 5/2008 | Arias Estrada | G06T 7/002 382/154 |
| 2009/0067749 A1 * | 3/2009 | Schiewe | H04N 9/3194 382/294 |
| 2010/0165116 A1 * | 7/2010 | Hsieh | G06T 7/0042 348/187 |
| 2011/0025853 A1 | 2/2011 | Richardson | |
| 2011/0228104 A1 * | 9/2011 | Nelson | H04N 9/3147 348/190 |
| 2014/0176729 A1 * | 6/2014 | Saari | G01J 3/45 348/182 |

* cited by examiner

*Primary Examiner* — Paulos M Natnael
(74) *Attorney, Agent, or Firm* — Kilpatrick Townsend & Stockton LLP

(57) ABSTRACT

Methods, systems, computer-readable media, and apparatuses for calibrating an event-based camera are presented. One example method includes the steps of receiving a calibration image comprising intensity information for a set of image elements defining the calibration image; iteratively, until a threshold number of different image elements have been projected: selecting a portion of the calibration image corresponding to a subset of image elements of the set of image elements, the subset comprising less than all image elements in the set of image elements, and comprising at least one image element not previously selected; projecting the selected portion of the calibration image onto a sensor of the event-based camera; detecting, by the sensor, the selected portion of the calibration image; generating a set of detected pixels corresponding to the detecting; and discontinuing projection of the selected portion; and determining, for a position of the event-based camera, at least one calibration parameter using the generated sets of detected pixels.

32 Claims, 8 Drawing Sheets

MULTIPLEXED TEMPORAL CALIBRATION FOR EVENT-BASED CAMERAS

BACKGROUND

Aspects of the disclosure relate to providing a calibration image sequence for an event-based camera.

A conventional camera typically captures a frame indicating light detected by all pixels of a pixel array as detected over a defined exposure time. In contrast, an event-based camera may generate a signal, indicating occurrence of an event, each time light detected by an individual pixel of a pixel array changes by more than a threshold level. The event camera may have microsecond-level temporal resolution, such that millions of events can be detected by the sensor per second.

Calibrating an event-based camera allows determination (e.g., on a pixel-by-pixel basis) of optical distortion created by the optical components (e.g., lenses) of the event-based camera. Current calibration techniques for an event-based camera include displaying a flashing checkered calibration pattern on a display and detecting the flashing signal with the event-based camera. Alternative calibration techniques for event-based cameras may provide various benefits, such as increased calibration resolution and mitigation of interference due to reflected light from the calibration image sequence, among other benefits.

BRIEF SUMMARY

Certain aspects are described for calibration of an event-based camera.

In one example, a method for calibrating a camera is disclosed. The method includes receiving a calibration image comprising intensity information for a set of image elements defining the calibration image, the intensity information defining a calibration pattern; iteratively, until a threshold number of different image elements of the set of image elements have been projected: selecting a portion of the calibration image corresponding to a subset of image elements of the set of image elements, the subset comprising less than all image elements in the set of image elements, the selected portion comprising image elements not previously selected; projecting the selected portion of the calibration image onto a sensor of the event-based camera based on the intensity information; detecting, by the sensor, the selected portion of the calibration image; generating a set of detected pixels corresponding to the detecting of the selected portion of the calibration image; and discontinuing projection of the selected portion; and determining, for a first position of the event-based camera relative to the projecting, at least one calibration parameter using the generated sets of detected pixels.

In another example, a system for calibrating a camera is disclosed. The system includes a computing device comprising a non-transitory computer-readable medium and a processor; a display device; and an event-based camera comprising a sensor; wherein the processor is configured to: receive a calibration image comprising intensity information for a set of image elements defining the calibration image, the intensity information defining a calibration pattern; iteratively, until a threshold number of different image elements of the set of image elements have been projected: select a portion of the calibration image corresponding to a subset of image elements of the set of image elements, the subset comprising less than all image elements in the set of image elements, the selected portion comprising image elements not previously selected; cause the display device to project the selected portion of the calibration image onto a sensor of the event-based camera based on the intensity information; and discontinue projection of the selected portion; and wherein the event-based camera is configured to: detect, using the sensor, the selected portions of the calibration image; generate a set of detected pixels corresponding to the detecting of the successive portions of the calibration image; and determine, for a first position of the event-based camera relative to the projecting, at least one calibration parameter using the generated sets of detected pixels.

In a further example, a non-transitory computer-readable storage medium comprising one or more programs is disclosed. The one or more programs are configured to be executed by a processor for performing a method of calibrating a camera and configured to cause one or more processors to receive a calibration image comprising intensity information for a set of image elements defining the calibration image, the intensity information defining a calibration pattern; iteratively, until a threshold number of different image elements of the set of image elements have been projected: select a portion of the calibration image corresponding to a subset of image elements of the set of image elements, the subset comprising less than all image elements in the set of image elements, the selected portion comprising image elements not previously selected; cause the display device to project the selected portion of the calibration image onto a sensor of the event-based camera based on the intensity information; detect, using the sensor, the selected portions of the calibration image; generate a set of detected pixels corresponding to the detecting of the successive portions of the calibration image; and discontinue projection of the selected portion; and determine, for a first position of the event-based camera relative to the projecting, at least one calibration parameter using the generated sets of detected pixels.

In an additional example, a system for calibrating an event-based camera is disclosed. The system includes means for receiving a calibration image comprising intensity information for a set of image elements defining the calibration image, the intensity information defining a calibration pattern; means for selecting a portion of the calibration image corresponding to a subset of image elements of the set of image elements, the subset comprising less than all image elements in the set of image elements, the selected portion comprising image elements not previously selected; means for projecting the selected portion of the calibration image onto a sensor of the event-based camera based on the intensity information; means for detecting, by the sensor, the selected portion of the calibration image; means for generating a set of detected pixels corresponding to the detecting of the successive portions of the calibration image; and means for discontinuing projection of the selected portion; means for determining, for a first position of the event-based camera relative to the projecting, at least one calibration parameter using the generated sets of detected pixels.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

Aspects of the disclosure are illustrated by way of example. In the accompanying figures, like reference numbers indicate similar elements.

DETAILED DESCRIPTION

Figure 1A:
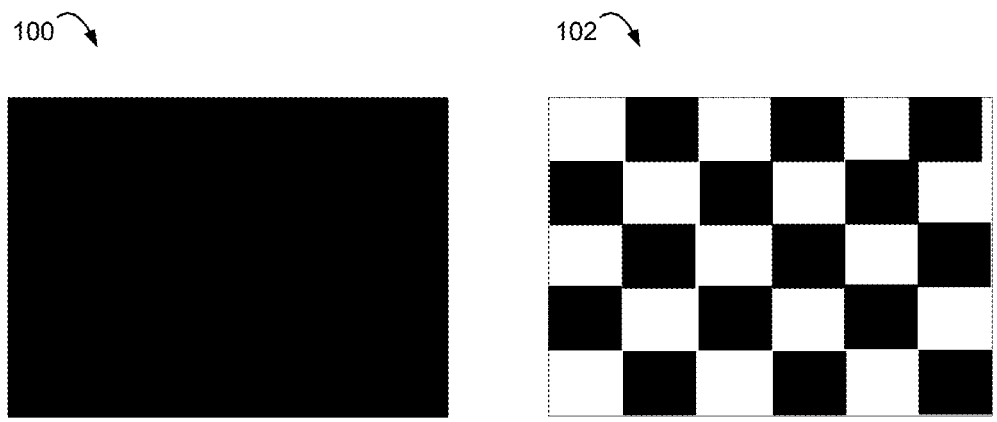
FIGS. 1A-1B illustrate a conventional camera calibration technique involving use of a checkered calibration image sequence.

Several illustrative examples will now be described with respect to the accompanying drawings. While particular examples, in which one or more aspects of the disclosure may be implemented, are described below, other examples may be used and various modifications may be made without departing from the scope of the disclosure or the spirit of the appended claims.

A technique is described for multiplexed temporal calibration for event-based cameras.

As described herein, the term "event-based camera" refers to a device that includes a pixel array. Each pixel of the pixel array may be a photodetector, such as a dynamic vision sensor (DVS), a complementary metal-oxide-semiconductor sensor, a charge coupled-device, a photodiode, a phototransistor, etc. In some examples, an event-based camera includes a computing device. The computing device may receive output data from the pixel array.

A pixel of an event-based camera may generate a signal based on a detected level of illumination. For example, a pixel may generate a signal indicating an event occurrence when a detected level of illumination differs from a stored and/or current level of illumination by more than a threshold amount, such as a predetermined logarithmic difference in sensed intensity. Events may be "positive," e.g., for an increase in level illumination exceeding a threshold and/or "negative," e.g., for a decrease in level illumination exceeding a threshold. In another example, a pixel may generate a signal having a level (e.g., current level, voltage level) that is proportional to a level of illumination detected by the pixel.

Various numbers and arrangements of pixels may be used for the pixel array of an event-based camera, e.g., 128×128 pixels, 240×180 pixels, 320×240 pixels, etc. Calibration techniques and/or apparatus as described herein may be used with event-based cameras having larger pixel arrays.

An event-based camera may have a temporal resolution on the order of microseconds, e.g., a temporal resolution of under 10 µs or of 1 µs. Such temporal resolution may allow examples according to this disclosure to be executed at high speed. For example, for an event-based camera comprising a sensor with a temporal resolution of 1 µs, image elements of a calibration image may be cycled at a rate of 1 MHz.

In some examples, a signal produced by an event-based camera may include, for each event, a pixel identifier (e.g., a set of pixel coordinates, a numerical identifier for a pixel, etc.) and an event polarity (e.g., an indication of whether a detected event corresponds to a positive or negative change in intensity).

It should be noted that the term "image element" is used herein to refer to a portion of a calibration image, which may include a pixel or point in an image file, a pixel or point on a display device, or other types of light sources. For example, an image element could be an LED pixel in a typical display device or it could be a lightbulb. In some examples, an image may be a raster image comprising a plurality of pixels, each an image element or a part of an image element, arranged in a two-dimensional array where each pixel has associated intensity information, which could include color information for one or more color channels, brightness, etc. In some examples, a display device to project an image could be constructed in three dimensions, such as by arranging a plurality of light-emitting elements, each of which may be referred to as an image element. For example, a three-dimensional array of lights, such as LEDs, could be constructed, where each constituent light is referred to as an image element. In some examples, such a three-dimensional array of lights may comprise a curved display screen. In some examples, the three-dimensional array of lights may comprise a plurality of LEDs positioned at various locations on a scaffolding or similar support structure. In some example, a calibration image may comprise a plurality of images that may be displayed in a sequence, e.g., an animated GIF that progresses in sequence through the frames in the GIF file. In one such example, each constituent image of the plurality of images may be an image element or may include a plurality of image elements.

As described here, the term "display" may refer to a computing device including an integrated display, a display device communicatively connected to a computing device, or another display. A computing device may be, e.g., a desktop computer, a laptop computer, a media playback device, etc. A display device may be, e.g., a liquid crystal display (LCD), cathode ray tube (CRT) display, organic light emitting diode (OLED) display, a projector, etc. In some examples, a device may be a board or other surface on which one or more light emitting diodes (LEDs) or other type of light source is mounted.

As described herein, the term "calibration" may refer to determining one or more intrinsic camera calibration parameters, e.g., of an event-based camera. Intrinsic camera calibration parameters may indicate distortion introduced by a component of a camera, such as focal length, center point, skew, radial distortion, and other non-linear distortion parameters introduced by an optical component (such as a lens) of the camera. For example, when a camera captures an image of a surface featuring straight lines, the lines in the capture image may appear to be distorted (e.g., curved) due to the properties of the camera optics.

Applications for which event-based cameras may be used include motion sensing and other machine vision applications. Event-based cameras may also be used for camera pose information, such as determining a distance and orientation of a camera relative to a surface, e.g., in support of augmented reality applications.

Figure 1B:
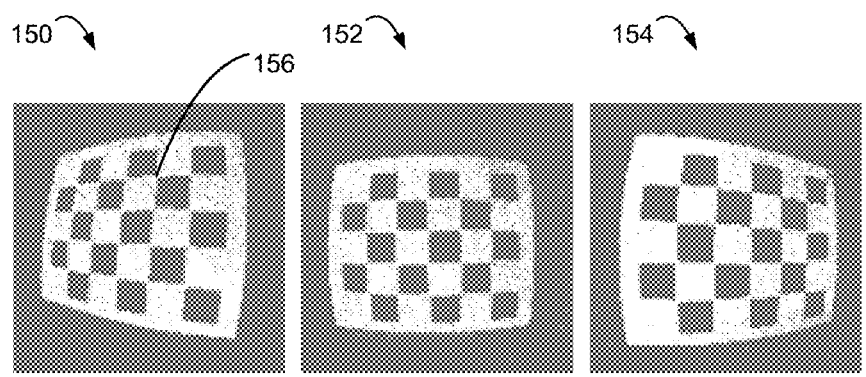

FIGS. 1A-1B illustrate a conventional camera calibration technique involving use of a checkered calibration image sequence. Calibration may be performed by displaying the checkered calibration image sequence on a display device and capturing images of the display device using a conventional camera. Typically, images of the calibration image sequence are captured by the camera while the camera is located at multiple positions relative to the display. For example, during calibration, the camera may be moved relative to the display and/or the display may be moved relative to the camera.

FIG. 1A illustrates an example illustration of a two-phase checkered calibration sequence. The first phase of the two-phase calibration sequence may be a blank image, e.g., as depicted at 100. The second phase of the two-phase calibration image sequence may be a checkered image, e.g., as depicted at 102. During calibration, the display rapidly switches between displaying the first phase 100 and the second phase 102 of the two-phase calibration sequence.

FIG. 1B illustrates images of the displayed two-phase calibration sequence of FIG. 1A as captured by a camera, according to an example. Image 150 is an image captured by the camera at a first position relative to a display, image 152 is an image captured by the camera at a second position relative to the display, and image 154 is an image captured by the camera at a third position relative to the display. The curvature at the edges of checkered image 102 as captured by the camera in images 150-154 indicates distortion caused by the camera. The images may be processed using well known image processing techniques to identify points at the junctions of box corners (e.g., point 156) in checkered image 102 as captured in images 150-154. Various well known camera calibration algorithms, for example the algorithms of GML C++ Camera Calibration toolbox (http://graphics.cs.msusu/en/node/909) may be used to calculate intrinsic and/or extrinsic camera parameters based on images such as 152-154.

For event-based cameras, an alternative to the two-phase calibration sequence using a checkerboard image, such as the sequence illustrated in FIG. 1A, may be desirable for various reasons. For example, because an event-based camera may have a number of pixels that is small relative to the number of pixels of a conventional camera, the number of boxes in a checkerboard image resolvable by the event-based camera may produce too few points 156 for a desired accuracy of calibration. Also, the strobing that occurs when a display rapidly switches between displaying the first phase 100 and the second phase 102 of the two-phase calibration image sequence may cause reflected light (e.g., from surfaces of a room in which calibration occurs) that interfere with image detection for calibration. Further, fixed pattern noise (i.e., pixels that, due to manufacturing variances or other causes, are substantially more or less sensitive compared to the other pixels in an array) may not be addressed by calibration performed using a two-phase calibration image sequence.

As described below, an alternative calibration technique that is usable for event-based camera calibration may utilize a sequence of calibration images in which each image features one or more calibration points, e.g., a single calibration point. The alternative calibration technique described below may allow event-based cameras to be calibrated with an adequate level of accuracy. The alternative calibration technique may mitigate or eliminate the effects of noise from strobing reflected light from the calibration images. Additionally, the alternative calibration technique described below may allow for calibration that corrects fixed pattern noise.

Figure 2:
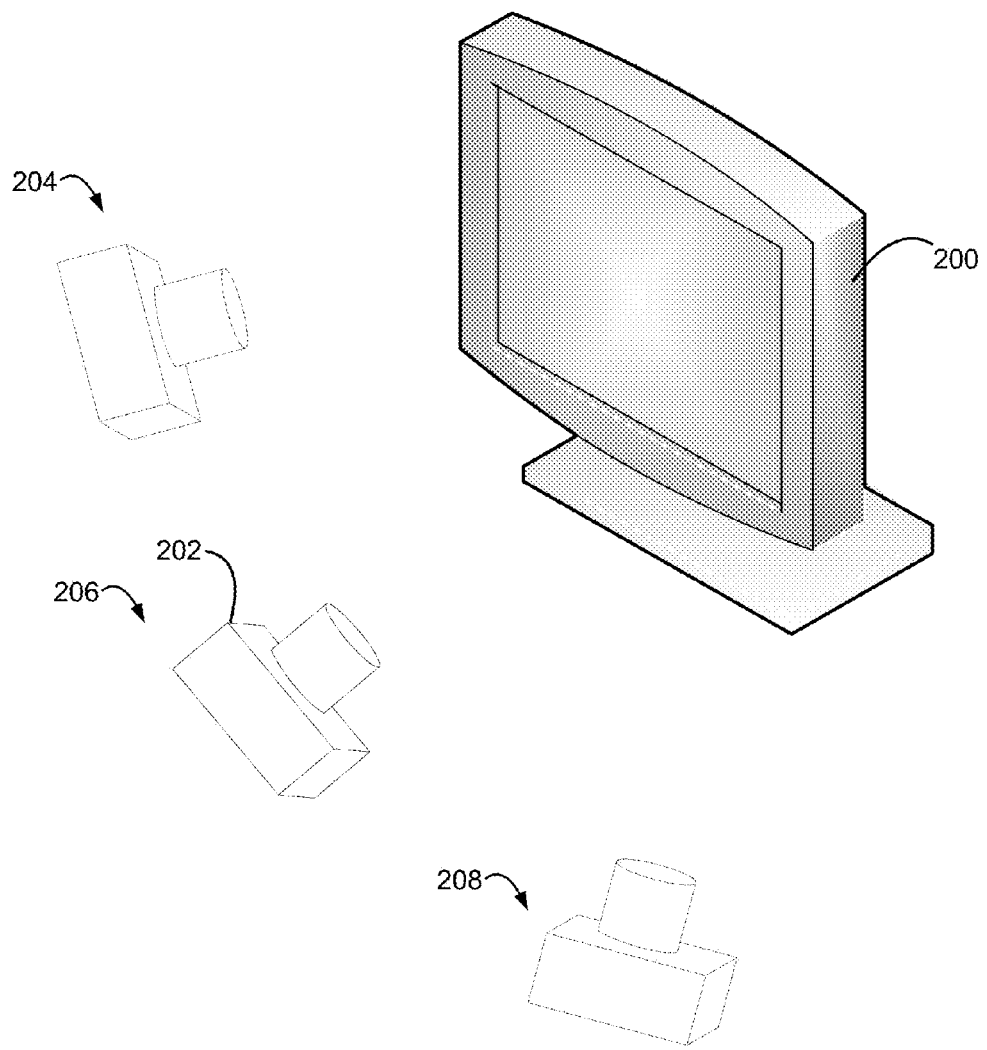
FIG. 2 illustrates an example configuration of devices for event-based camera calibration, according to some examples.

FIG. 2 illustrates a configuration of devices for event-based camera calibration, according to an example. The devices include a display 200 and an event-based camera 202.

Display 200 may be used to display a calibration image sequence. Event-based camera 202 may capture images of a calibration image sequence displayed by device 200. In some examples, event-based camera 202 may capture images from multiple positions relative to display 200. In the illustrative example of FIG. 2, event-based camera 202 is shown at a first position 204 relative to display 200, a second position 206 relative to display 200 and third position 208 relative to display 200.

Figure 3A:
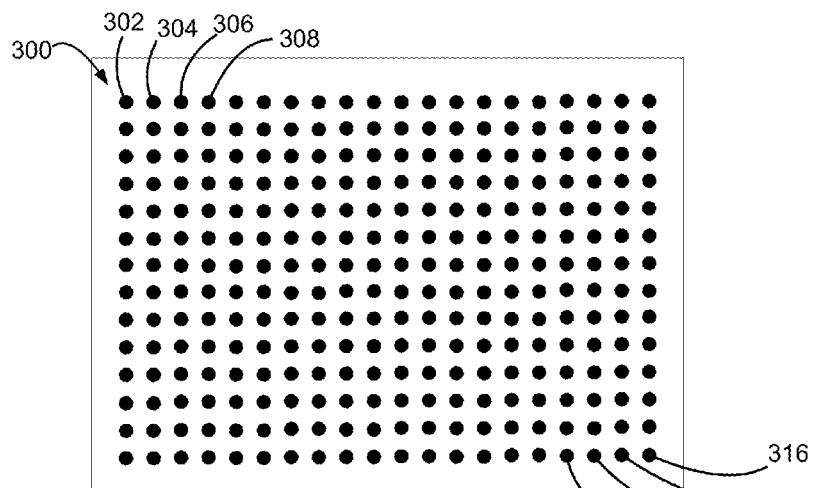
FIG. 3A illustrates a grid of points that may be used as a calibration image sequence for a camera such as an event-based camera, according to some examples.

FIG. 3A illustrates a grid of image elements, e.g., points, that may be used as a calibration image sequence for a camera such as an event-based camera, according to an example. In FIG. 3A, a grid 300 of points (e.g., point 302) is shown.

Figure 3B:
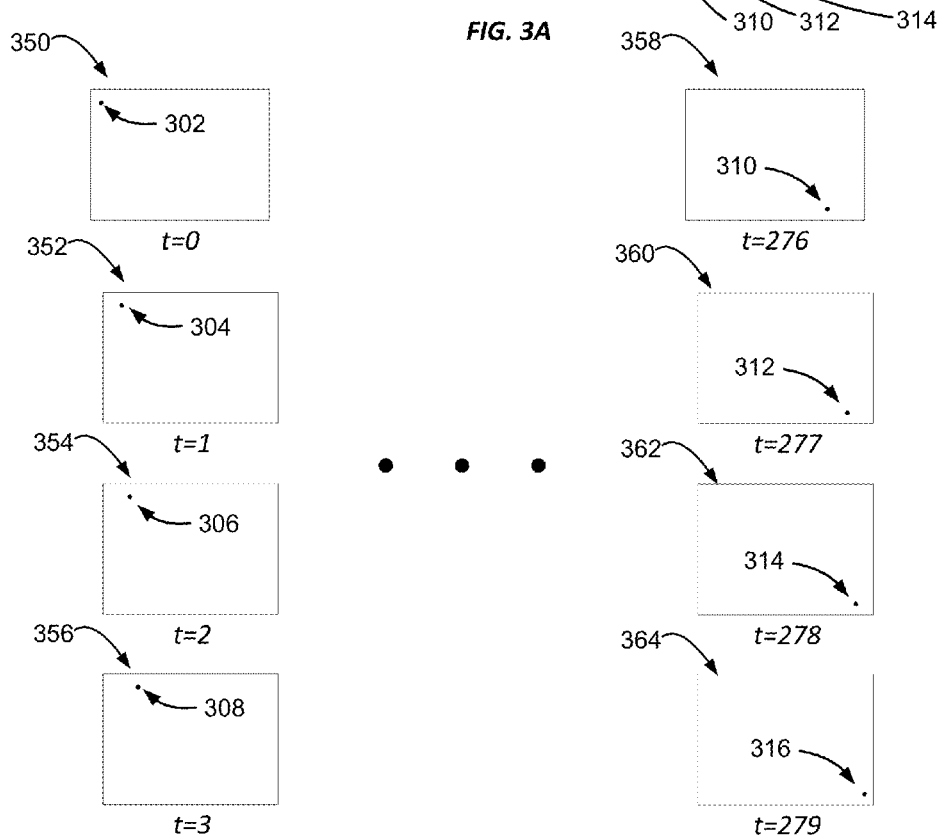
FIG. 3B illustrates a calibration image sequence including a sequence of images, each image including a point from a grid, according to some examples.

FIG. 3B illustrates a calibration image sequence including a sequence of images 350-364, each image including a point from grid 300. It will be recognized that different numbers of points may be used for grid 300. The number of points in grid 300 may be selected based on, e.g., the number of pixels in the pixel array of the event-based camera to be calibrated.

Each image of the sequence of images in the calibration image sequence, including images 350-364, may be displayed by display 200 at a different time, as indicated by the time labels (e.g., t=0). For example, a first image 350 including point 302 of grid 300 may be displayed at a first time indicated by t=0. A second image 352 including point 304 of grid 300 may be displayed at a second time indicated by t=1. A third image 354 including point 306 of grid 300 may be displayed at a third time indicated by t=2, and a fourth image 356 including point 308 of grid 300 may be displayed at a fourth time indicated by t=3. At time t=4, an image including the next point in the top row of grid 300 may be displayed, and so on until each point in the top row has been sequentially displayed. After each point in the top row has been displayed, points from the row below the top row may be sequentially displayed, and so on, until all points of all of the rows of grid 300 have been sequentially displayed, as indicated by the ellipses in FIG. 3B. At times t=276, t=277, t=278, and t=279, images including points 310, 312, 314, and 316, respectively, may be shown. After the image including the final point in grid 300 (e.g., image 364) is displayed, the calibration image sequence may repeat such that the image including the first point in grid 300 (e.g., image 350) is displayed. A complete calibration image sequence is a sequence in which a series of images including each point of grid 300 is displayed.

The area of an image element (e.g., point 302) may be or correspond to a pixel set of, for example, a single pixel, a 1×2 array of pixels, a 2×2 array of pixels, or another area. Each point may be immediately adjacent to surrounding points in grid 300 or a point may be separated from surrounding points by a separation border distance of, e.g. 1 pixel, 2 pixels, 4 pixels, or another separation border distance between adjacent points. While FIG. 3B indicates black points displayed on a white field, it will be recognized that white points displayed on a black field or any other color combination with sufficient contrast may be used for the images of the calibration image sequence. In some examples, sub-pixel level calibration resolution of event-based camera 202 can be obtained, e.g., when a point of grid 300 (e.g., point 302) causes event output from multiple pixels of event-based camera 202.

In some examples, a display may include an array of LEDs arranged in a grid 300. In a illustrative example, such a display may display image 350 by switching on an LED at point 302 while the remainder of the LEDs in grid 300 are switched off.

Each image element of the calibration sequence may be displayed for a period of time that is less than one second, e.g., 0.2 seconds. For example, t=0 may occur at 0 seconds, t=1 may occur at 0.2 seconds, t=2 may occur at 0.4 seconds, t=3 may occur at 0.6 seconds, and so on. Each image of the calibration image sequence may be displayed immediately after the preceding image is displayed, or a blank display may be displayed between images of the calibration image sequence. In some examples, the period of time for which an image of the calibration sequence is displayed may be related to a refresh rate of a display.

It may be desirable for event-based camera 202 to capture one or more complete calibration image sequences at multiple locations relative to display 200. For example, event-based camera 202 may capture a complete calibration image sequence at position 204, then capture a complete calibration image sequence at position 206, and subsequently capture a complete calibration image sequence at position 208. As event-based camera 202 captures the images of the calibration image sequence, event-based camera 202 may produce an output signal including event data indicating pixels that detected a change in illuminance exceeding a threshold value.

If multiple adjacent points of grid 300 were displayed in an image of the calibration image sequence, detection of one point may interfere with detection of a nearby point in the image. By displaying a single grid point in each image of the calibration image sequence, the potential for detection of one point to interfere with another is eliminated. In some examples, images of the calibration image sequence may include multiple points of grid 300, however, the multiple points are preferably distant from one another to avoid detection interference.

Figure 4:
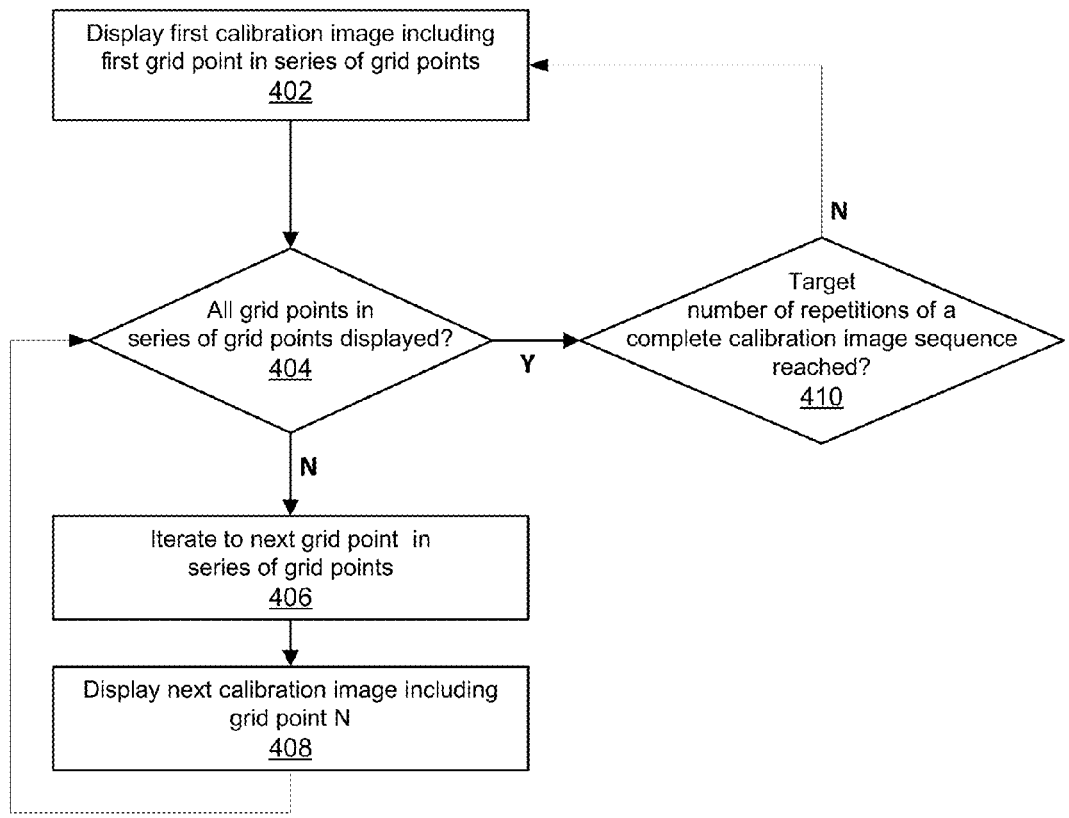
FIG. 4 is a flow diagram illustrating an example process for displaying a series of grid points by a display, according to some examples.

FIG. 4 is a flow diagram illustrating an example process for displaying a series of grid points by a display.

At operation 402, display 200 may, at a first time (e.g., t=0), display a first image 350 in a calibration image sequence including a first grid point 302.

At decision diamond 404, it may be determined whether all grid points (e.g., 302, 304, 306, 308 . . . 310, 312, 314, 316) of grid 300 used in the calibration image sequence have been displayed by display 200. If all grid points of grid 300 have not been displayed, flow may proceed to operation 406. If all grid points of grid 300 have been displayed, flow may proceed to operation 410.

At operation 406, an iteration may be performed from a current grid point (e.g., grid point 302) to a next grid point in a series of grid points (e.g., grid point 304). At operation 408, display 200 may display a next calibration image including the next grid point (as determined at operation 406).

In some examples, it may be desirable for event-based camera 202 to be calibrated using multiple complete calibration image sequences. For example, event-based camera 202 may generate event data corresponding to grid point 302 of calibration image 350 when one or more pixels of event-based camera 202 generate event signals at a frequency that is equal or substantially similar to (e.g., within 0.1 to 5 Hz, such as 1-2 Hz, e.g., within 1 Hz) a frequency within which grid point 302 is displayed by display 200. For this frequency-based approach to grid point detection, a complete calibration image sequence may be repeated 5-100 times, e.g., 20 times. One or more pixels that generate an event at the same or a substantially similar frequency at which a grid point is shown (e.g., a frequency in the range of 50-5 kHz, such as 500 Hz) may be determined to correspond to the grid point.

At operation 410, it may be determined whether a target number of repetitions of a complete calibration image sequence has been reached. For example, a target number of repetitions for a complete calibration image sequence is 20 repetitions, operation 410 may determine whether the complete calibration image sequence has been repeated 20 times. If the target number of repetitions of the complete calibration image sequence has not been reached, flow may return to operation 402.

The operations discussed with regard to FIG. 4 may be repeated each time event-based camera 202 is repositioned (e.g., to positions 204, 206, 208) relative to display 200.

Figure 5:
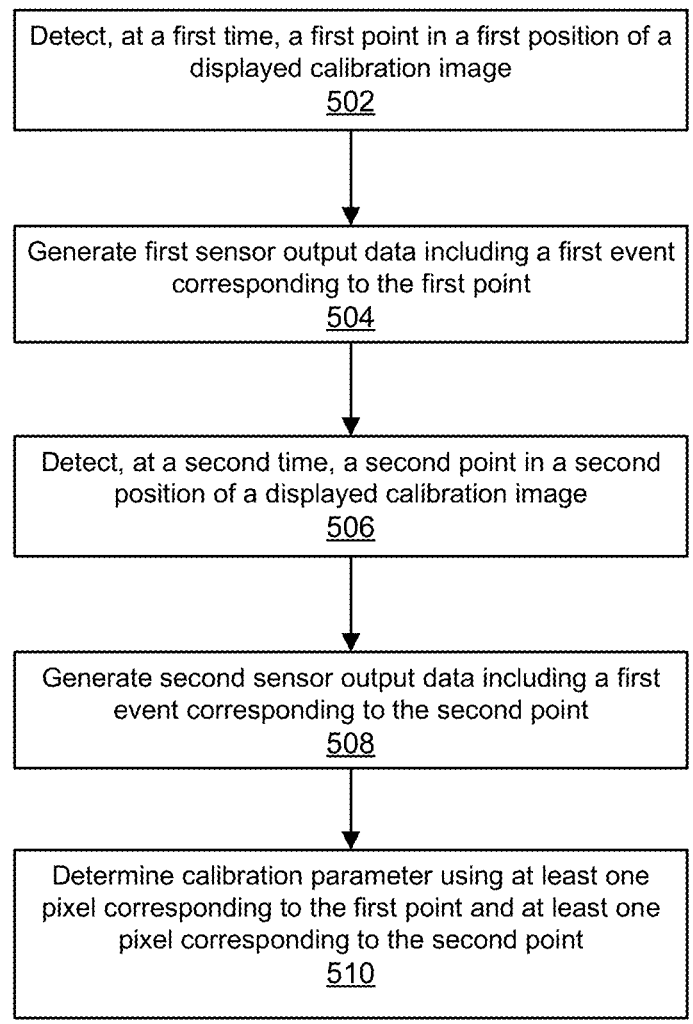
FIG. 5 is a flow diagram illustrating an example process for calibrating a camera, according to some examples.

FIG. 5 is a flow diagram illustrating an example process for calibrating an event-based camera.

At operation 502, event-based camera 202 may detect, at a first time (e.g., t=0), a first point (e.g., point 302) of a first masked calibration image (e.g., image 350) displayed by display 200. In one example, the calibration image comprises calibration image 300. The calibration image 300 may then be masked such that only a portion of the calibration image 300 is displayed At operation 504, event-based camera 202 may generate first sensor output data including a first event corresponding to the first point. The first sensor output data may include identifiers for one or more pixels at which the first event corresponding to the first point was detected.

At operation 506, event-based camera 202 may detect, at a second time (e.g., t=1), a second point (e.g., point 304) in a second position of a calibration image (e.g., image 352) displayed by display 200.

At operation 508, event-based camera 202 may generate second sensor output data including a first event corresponding to the second point. The second sensor output data may include identifiers for one or more pixels at which the first event corresponding to the second point was detected.

At operation 510, a calibration parameter may be determined using at least one pixel corresponding to the first point and at least one pixel corresponding to the second point. An algorithm, such as an algorithm of the GML C++ Camera Calibration toolbox discussed above, may be used to calculate intrinsic and/or extrinsic camera parameters.

In some examples, as discussed above, a complete calibration image sequence may repeat multiple times (e.g., 20 times) at a particular frequency (e.g., 500 Hz). For example, a calibration image 350 including first point 302 at a first position may be displayed at a first time (e.g., t=0), at a second time (e.g., t=20), at a third time (e.g., t=40), etc. An algorithm may determine that one or more pixels of the event-based camera 202 correspond to the first point 302 when the one or more pixels generate events at a frequency that is substantially similar to the frequency at which calibration image 350 is shown in a repeating complete calibration image sequence.

In other examples, an algorithm may determine that a pixel of the event-based camera 202 correspond to the first point 302 when the pixel produces the highest number of events among the pixels of the pixel array of event camera 202 at the times when image 350 is shown.

Figure 6:
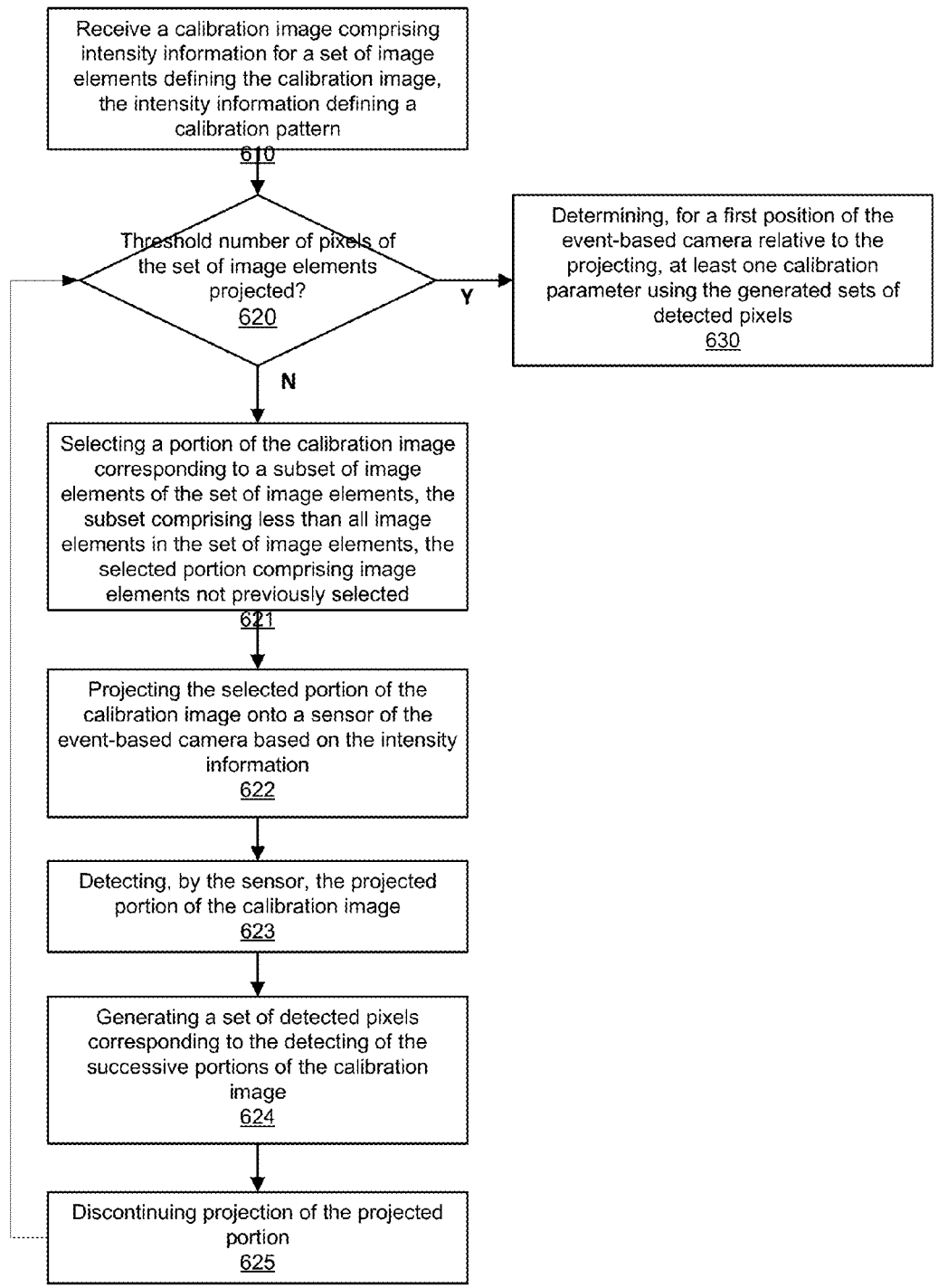
FIG. 6 is a flow diagram illustrating an example process for calibrating a camera, according to some examples.

FIG. 6 is a flow diagram illustrating an example process for calibrating a camera. The method of FIG. 6 is described with reference to the example system 800, including computing device 801, shown in FIG. 8, but is not limited to such a device.

At operation 610, the computing device 801 receives a calibration image comprising intensity information for a set of image elements defining the calibration image, the intensity information defining a calibration pattern. For example, a computing device, such as device the computing device 801 of FIG. 8, receives a file comprising a calibration image, such as a .GIF file, a JPEG file, etc. In some examples, a calibration image may comprise information about an arrangement of lights in a three-dimensional configuration. For example, the calibration image may comprise instructions for a sequential illumination of lights arranged in a three-dimensional configuration.

At operation 620, the computing device 801 determines whether a threshold number of image elements of the set of image elements has been projected. For example, the computing device 801 may have a threshold of all image elements in the calibration image, or at least 50% of the image elements in the calibration image. In some examples, the threshold may comprise a minimum number of image elements in different regions of the calibration image. For example, the calibration image may be divided into quadrants and the threshold may require that at least 75% of all image elements in the calibration image must be projected, and at least 25% of all image elements in each of the quadrants must be projected. Still other thresholds may be employed as well. If the threshold has not been reached, the method proceeds to operation 621 to iterate through operations 621-625, otherwise, it proceeds to operation 630.

At operation 621, the computing device 801 selects a portion of the calibration image corresponding to a subset of image elements of the set of image elements, the subset comprising less than all image elements in the set of image elements, the selected portion comprising at least one image element not previously selected. For example, the computing device 801 may progressively step through every image element in a calibration image one image element at a time, and thus it may select the next image element in the calibration image. In some examples, the computing device 801 may select a grouping of a plurality of image elements. Such groupings may comprise contiguous groups of image elements, such as 4 adjacent image elements, or it may comprise non-contiguous groups of image elements. For example, the computing device 801 may subdivide the calibration image into quadrants and select one image element from each quadrant. In some examples, a selected subset may comprise at least some of the image elements from one or more previously-selected subsets, but also comprises at least one image element that has not previously been projected.

At operation 622, the computing device 801 projects the selected portion of the calibration image onto a sensor of the event-based camera based on the intensity information. For example, the computing device 801 may illuminate image elements on a display device corresponding to the selected portion of the calibration image to project the selected portion onto the sensor of the event-based camera. In some examples, the computing device may illuminate one or more lights that have been arranged in a three-dimensional configuration.

At operation 623, the sensor of the event-based camera detects the selected portion of the calibration image, such as discussed above with respect to FIGS. 3-5.

At operation 624, the sensor of the event-based camera generates a set of detected pixels corresponding to the detecting of the successive portions of the calibration image. As discussed above, the set of detected pixels may include identifiers for one or more pixels at which the portion of the calibration image was detected.

At operation 625, the computing device 801 discontinues projection of the selected portion. Thus, the computing device 801 projects the selected portion for a period of time to allow the sensor of the event-based camera to detect the selected portion, and then discontinues projection of the selected portion. The method then returns to block 620 to perform another iteration if the threshold has not been met.

At block 630, after the threshold number of image elements of the set of image elements has been projected, the event-based camera determines, for its then current position, at least one calibration parameter using the generated sets of detected pixels. Techniques for determining calibration parameters have been discussed above and may include other techniques known to those of skill in the art. For example, a calibration parameter may comprise a radial distortion of a camera lens. After block 630, the event-based camera may be repositioned and the method may be performed additional times as desired to obtain additional calibration parameters to enable calibration of the event-based camera.

As discussed above, the rate at which the method may be performed may depend on a temporal resolution of the sensor of the event-based camera being calibrated. For example, an event-based camera having a temporal resolution of 2 μs, the loop illustrated in the example method of FIG. 6 could operate at a rate of 500 kHz. If a threshold is set to 1000 image elements, the method could be performed in 0.002 s before repositioning the camera to re-perform the method. Thus, calibration of event-based cameras according to this disclosure may be performed in a short period of time.

Figure 7:
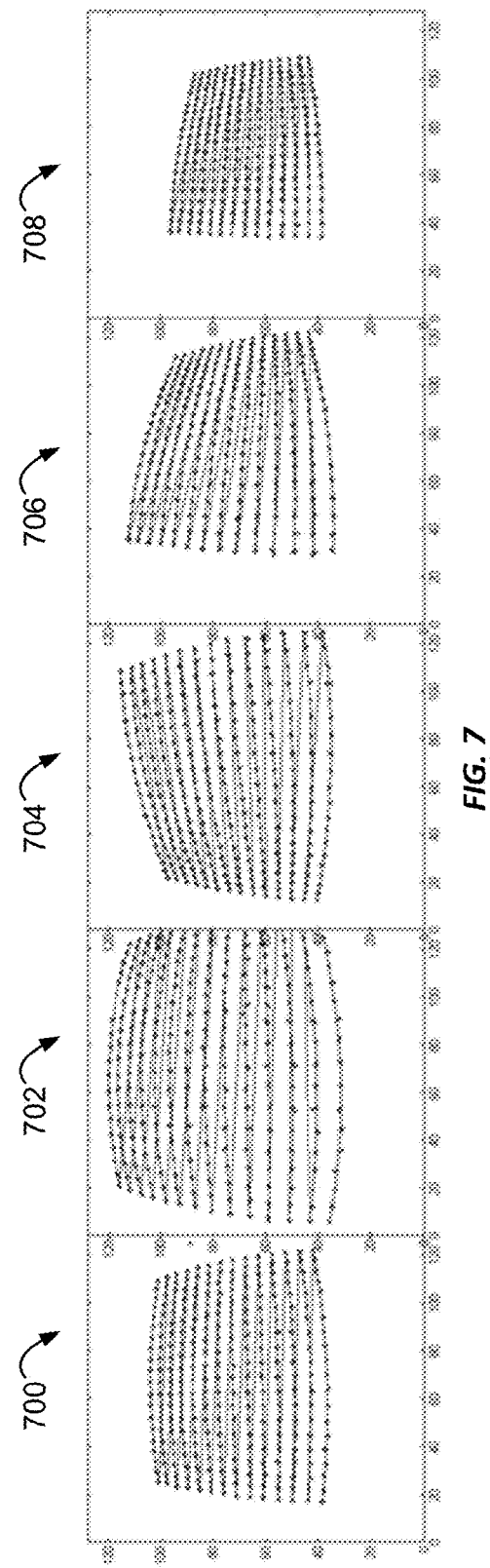
FIG. 7 illustrates pixels corresponding to grid points of a grid as determined at five locations of an event-based camera relative to a display.

FIG. 7 illustrates pixels corresponding to grid points (e.g., 302, 304, 306, 308 . . . 310, 312, 314, 316) of grid 300 as determined at five locations 700, 702, 704, 706, and 708 of event-based camera 202 relative to display 200. Radial distortion of event camera 202 is evident from the distorted (i.e., curved) reference lines that connect the grid points in these images.

Figure 8:
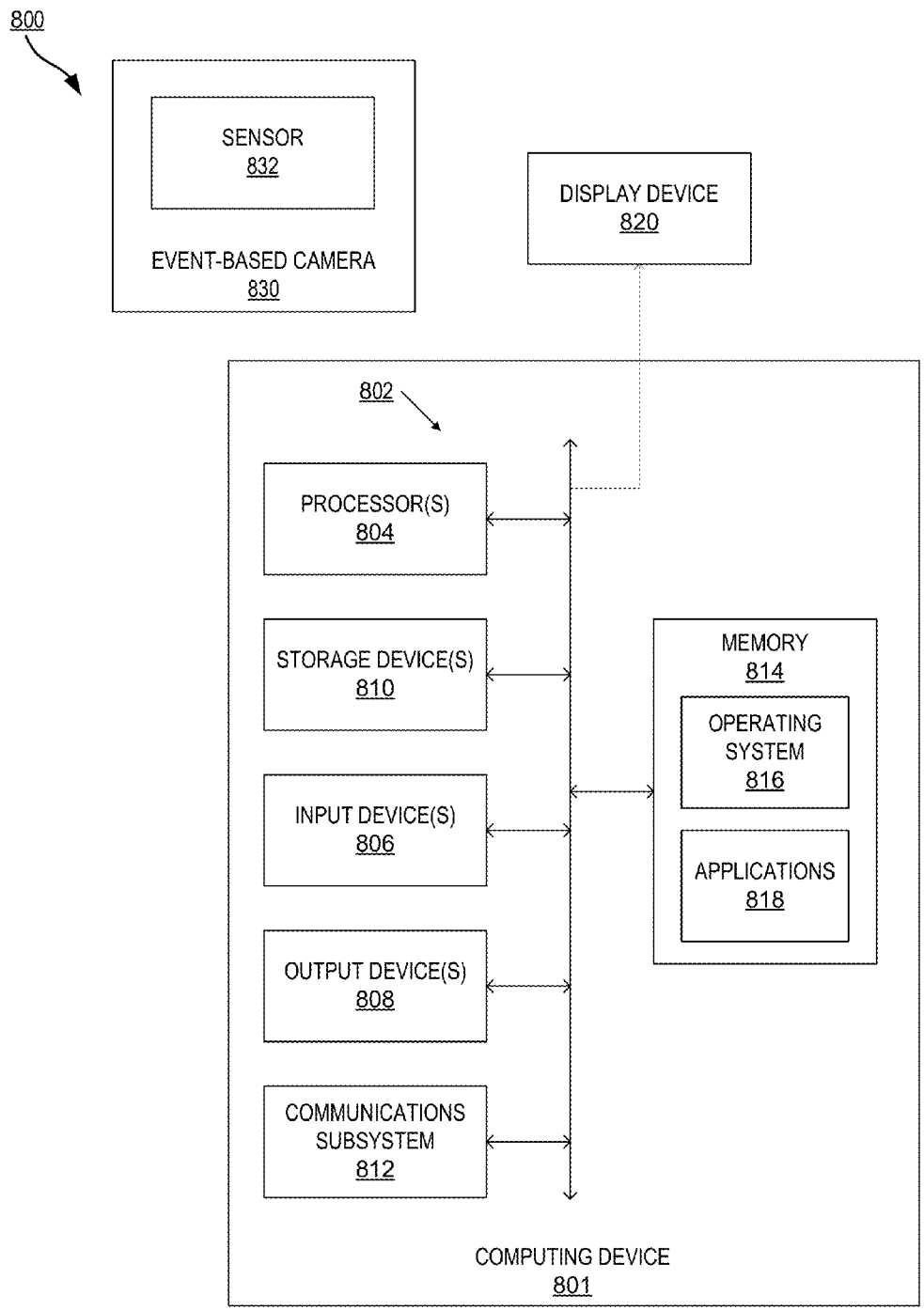
FIG. 8 illustrates an example of a computing system, according to some examples.

FIG. 8 provides a schematic illustration of one example of a system 800 that can perform the methods provided by various examples as described herein, and/or can provide multiplexed temporal calibration for event-based cameras. FIG. 8 is meant to provide a generalized illustration of various components, any or all of which may be utilized as appropriate. FIG. 8, therefore, broadly illustrates how individual system elements may be implemented in a relatively separated or relatively more integrated manner.

The system 800 comprises a computing device 801, a display device 820, and an event-based camera 830. The event based-camera 830 comprises at least one sensor 832. In this example, the sensor 832 comprises a pixel array and is configured to detect events as discussed above.

The computing device 801 comprises hardware elements that can be electrically coupled via a bus 802 (or may otherwise be in communication, as appropriate). The hardware elements may include one or more processors 804, including without limitation one or more general-purpose processors and/or one or more special-purpose processors (such as digital signal processing chips, graphics acceleration processors, and/or the like); one or more input devices 806, which can include without limitation a mouse, a keyboard and/or the like; and one or more output devices 808, which can include without limitation a display device, a printer and/or the like. In some examples, display device 820 may be an output device 808 and may be integrated into the computing device 801. In some examples, however, the display device may be separate from the computing device 801, such as a separate display screen, a projector, a free-standing structure comprising one or more lightbulbs, or other suitable display device 820.

The computing device 801 may further include (and/or be in communication with) one or more non-transitory storage devices 810, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computing device 801 might also include a communications subsystem 812, which can include without limitation a modem, a network card (wireless and/or wired), an infrared communication device, a wireless communication device and/or chipset (such as a Bluetooth™ device, an 802.11 device, a Wi-Fi device, a WiMax device, cellular communication facilities, etc.), and/or similar communication interfaces. A computing system may include one or more antennas for wireless communication as part of communications subsystems 812 or as a separate component coupled to any portion of the system. The communications subsystem 812 may permit data to be exchanged with a network (such as the network described below, to name one example), other computer systems, and/or any other devices described herein. In many examples, the computing device 801 will further comprise a non-transitory working memory 814, which can include a RAM and/or ROM device, as described above.

The computing device 801 also can comprise software elements, shown as being currently located within the working memory 814, including an operating system 816, device drivers, executable libraries, and/or other code, such as one or more application programs 818, which may comprise computer programs provided by various examples, and/or may be designed to implement methods, and/or configure systems, provided by other examples, as described herein. Merely by way of example, one or more procedures and/or modules described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 810 described above. In some cases, the storage medium might be incorporated within a computer system, such as computing device 801. In other examples, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computing device 801 and/or might take the form of source and/or installable code, which, upon compilation and/or installation on the computing device 801 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, an system configured to provide some or all of the features described herein can comprise hardware and/or software that is specialized (e.g., an application-specific integrated circuit (ASIC), a software method, etc.) or generic (e.g., processor(s) 804, applications 818, etc.) Further, connection to other computing devices such as network input/output devices may be employed.

Some examples may employ a computer system (such as the computing device 801) to perform methods in accordance with the disclosure. For example, some or all of the procedures of the described methods may be performed by the computing device 801 in response to processor 804 executing one or more sequences of one or more instructions (which might be incorporated into the operating system 816 and/or other code, such as an application program 818) contained in the working memory 814. Such instructions may be read into the working memory 814 from another computer-readable medium, such as one or more of the storage device(s) 810. Merely by way of example, execution of the sequences of instructions contained in the working memory 814 might cause the processor(s) 804 to perform one or more procedures of the methods described herein.

The terms "machine-readable medium" and "computer-readable medium," as used herein, refer to any medium that participates in providing data that causes a machine to operate in a specific fashion. In an example implemented using the computing device 801, various computer-readable media might be involved in providing instructions/code to processor(s) 804 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 810. Volatile media include, without limitation, dynamic memory, such as the working memory 814. Transmission media include, without limitation, coaxial cables, copper wire and fiber optics, including the wires that comprise the bus 802, as well as the various components of the communications subsystem 812 (and/or the media by which the communications subsystem 812 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, and/or any other magnetic medium, a CD-ROM, any other optical medium, punch-cards, papertape, any other physical medium with patterns of holes, a RAM, a PROM, EPROM, a FLASH-EPROM, any other memory chip and/or cartridge, a carrier wave as described hereinafter, and/or any other medium from which a computer can read instructions and/or code.

Various forms of computer-readable media may be involved in carrying one or more sequences of one or more instructions to the processor(s) 804 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computing device 801. These signals, which might be in the form of electromagnetic signals, acoustic signals, optical signals and/or the like, are all examples of carrier waves on which instructions can be encoded, in accordance with various examples.

The communications subsystem 812 (and/or components thereof) generally will receive the signals, and the bus 802 then might carry the signals (and/or the data, instructions, etc. carried by the signals) to the working memory 814, from which the processor(s) 804 retrieves and executes the instructions. The instructions received by the working memory 814 may optionally be stored on a non-transitory storage device 810 either before or after execution by the processor(s) 804.

The methods, systems, and devices discussed above are examples. Various examples may omit, substitute, or add various procedures or components as appropriate. For instance, in alternative configurations, the methods described may be performed in an order different from that described, and/or various stages may be added, omitted, and/or combined. Also, features described with respect to certain examples may be combined in various other examples. Different aspects and elements of the examples may be combined in a similar manner. Also, technology evolves and, thus, many of the elements are examples that do not limit the scope of the disclosure to those specific examples.

Specific details are given in the description to provide a thorough understanding of the examples. However, examples may be practiced without these specific details. For example, well-defined circuits, processes, algorithms, structures, and techniques have been shown without unnecessary detail in order to avoid obscuring the examples. This description provides example examples, and is not intended to limit the scope, applicability, or configuration of the invention. Rather, the preceding description of the examples will provide those skilled in the art with an enabling description for implementing examples of the invention. Various changes may be made in the function and arrangement of elements without departing from the spirit and scope of the invention.

Also, some examples were described as processes depicted as flow diagrams. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several examples, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

The invention claimed is:

1. A method for calibrating an event-based camera, the method comprising:
  receiving a calibration image comprising intensity information for a set of image elements defining the calibration image, the intensity information defining a calibration pattern;
  iteratively, until a threshold number of different image elements of the set of image elements have been projected:
    selecting a portion of the calibration image corresponding to a subset of image elements of the set of image elements, the subset comprising less than all image elements in the set of image elements, the selected portion comprising at least one image element not previously selected;
    projecting the selected portion of the calibration image onto a sensor of the event-based camera based on the intensity information;
    detecting, by the sensor, the selected portion of the calibration image;
    generating a set of detected pixels corresponding to the detecting of the selected portion of the calibration image; and
    discontinuing projection of the selected portion; and
  determining, for a first position of the event-based camera relative to the projecting, at least one calibration parameter using the generated sets of detected pixels.

2. The method of claim 1, wherein the threshold number of different image elements is all of the image elements in the set of image elements.

3. The method of claim 1, wherein each subset only comprises image elements not included in prior subsets of image elements.

4. The method of claim 1, wherein the selected portions of the calibration image each comprise only one image element of the set of image elements.

5. The method of claim 1, wherein the method further comprises:
  changing a position of the event-based camera to a second position;
  iteratively, until a second threshold number of image elements of the set of image elements have been projected:
    projecting and discontinuing projection of successive portions of the calibration image corresponding to respective successive subsets of image elements of the set of image elements onto the sensor of the event-based camera based on the intensity information, each subset comprising less than all image elements in the set of image elements, the projecting and discontinuing configured to project only one portion of the calibration image at a time;
    detecting, by the sensor, the successive portions of the calibration image; and
    generating sets of detected pixels corresponding to the detecting of the successive portions of the calibration image; and
  determining, for the second position of the event-based camera relative to the projecting, at least one additional calibration parameter using the generated sets of detected pixels.

6. The method of claim 1, wherein the calibration image comprises a plurality of individual LEDs arranged in a three-dimensional configuration illuminated in a sequence.

7. The method of claim 1, wherein the at least one calibration parameter includes a radial distortion.

8. The method of claim 1, wherein the determining the at least one calibration parameter occurs only after the threshold number of different image elements has been projected.

9. The method of claim 1, wherein, after the threshold number of different image elements of the set of image elements have been projected, re-performing the iteration steps a pre-determined number of times before determining the at least one calibration parameter.

10. A system for calibrating an event-based camera, the system comprising:
   a computing device comprising a non-transitory computer-readable medium and a processor;
   a display device; and
   an event-based camera comprising a sensor;
   wherein the processor is configured to:
      receive a calibration image comprising intensity information for a set of image elements defining the calibration image, the intensity information defining a calibration pattern;
      iteratively, until a threshold number of different image elements of the set of image elements have been projected:
         select a portion of the calibration image corresponding to a subset of image elements of the set of image elements, the subset comprising less than all image elements in the set of image elements, the selected portion comprising at least one image element not previously selected;
         cause the display device to project the selected portion of the calibration image onto a sensor of the event-based camera based on the intensity information; and
         discontinue projection of the selected portion; and
   wherein the event-based camera is configured to:
      detect, using the sensor, the selected portions of the calibration image;
      generate a set of detected pixels corresponding to the detecting of the successive portions of the calibration image; and
      determine, for a first position of the event-based camera relative to the projecting, at least one calibration parameter using the generated sets of detected pixels.

11. The system of claim 10, wherein the threshold number of different image elements is all of the image elements in the set of image elements.

12. The system of claim 10, wherein each subset only comprises image elements not included in prior subsets of image elements.

13. The system of claim 10, wherein the selected portions of the calibration image each comprise only one image element of the set of image elements.

14. The system of claim 10, wherein the display device comprises a plurality of individual LEDs arranged in a three-dimensional configuration illuminated in a sequence.

15. The system of claim 10, wherein the at least one calibration parameter includes a radial distortion.

16. The system of claim 10, wherein the processor is further configured to determine the at least one calibration parameter occurs only after the threshold number of different image elements has been projected.

17. The system of claim 10, wherein the processor is further configured to, after the threshold number of different image elements of the set of image elements have been projected, re-perform the iteration steps a pre-determined number of times before determining the at least one calibration parameter.

18. One or more non-transitory computer-readable media comprising program code for calibrating an event-based camera, program code configured to cause a processor to:
   receive a calibration image comprising intensity information for a set of image elements defining the calibration image, the intensity information defining a calibration pattern;
   iteratively, until a threshold number of different image elements of the set of image elements have been projected:
      select a portion of the calibration image corresponding to a subset of image elements of the set of image elements, the subset comprising less than all image elements in the set of image elements, the selected portion comprising at least one image element not previously selected;
      cause a display device to project the selected portion of the calibration image onto a sensor of the event-based camera based on the intensity information;
      detect, using the sensor, the selected portions of the calibration image;
      generate a set of detected pixels corresponding to the detecting of the successive portions of the calibration image; and
      discontinue projection of the selected portion; and
   determine, for a first position of the event-based camera relative to the projecting, at least one calibration parameter using the generated sets of detected pixels.

19. The non-transitory computer-readable medium of claim 18, wherein the threshold number of different image elements is all of the image elements in the set of image elements.

20. The non-transitory computer-readable medium of claim 18, wherein each subset only comprises image elements not included in prior subsets of image elements.

21. The non-transitory computer-readable medium of claim 18, wherein the selected portions of the calibration image each comprise only one image element of the set of image elements.

22. The non-transitory computer-readable medium of claim 18, wherein the calibration image comprises instructions for illuminating a plurality of individual LEDs arranged in a three-dimensional configuration.

23. The non-transitory computer-readable medium of claim 18, wherein the at least one calibration parameter includes a radial distortion.

24. The non-transitory computer-readable medium of claim 18, wherein the program code is further configured to cause the processor to determine the at least one calibration parameter occurs only after the threshold number of different image elements has been projected.

25. The non-transitory computer-readable medium of claim 18, wherein the program code is further configured to cause the processor to, after the threshold number of different image elements of the set of image elements have been projected, re-perform the iteration steps a pre-determined number of times before determining the at least one calibration parameter.

26. A system for calibrating an event-based camera, the system comprising:

means for receiving a calibration image comprising intensity information for a set of image elements defining the calibration image, the intensity information defining a calibration pattern;

means for selecting a portion of the calibration image corresponding to a subset of image elements of the set of image elements, the subset comprising less than all image elements in the set of image elements, the selected portion comprising at least one image element not previously selected;

means for projecting the selected portion of the calibration image onto a sensor of the event-based camera based on the intensity information;

means for detecting, by the sensor, the selected portion of the calibration image;

means for generating a set of detected pixels corresponding to the detecting of the successive portions of the calibration image; and means for discontinuing projection of the selected portion;

means for iteratively employing the means for selecting, the means for projecting, the means for detecting, the means for generating, and the means for discontinuing projection until a threshold number of different pixels of the set of image elements have been projected means for determining, for a first position of the event-based camera relative to the projecting, at least one calibration parameter using the generated sets of detected pixels.

27. The system of claim 26, wherein the threshold number of different image elements is all of the image elements in the set of image elements.

28. The system of claim 26, wherein each subset only comprises image elements not included in prior subsets of image elements.

29. The system of claim 26, wherein the selected portions of the calibration image each comprise only one image element of the set of image elements.

30. The system of claim 26, wherein means for projecting comprises a plurality of individual LEDs arranged in a three-dimensional configuration illuminated in a sequence.

31. The system of claim 26, wherein the at least one calibration parameter includes a radial distortion.

32. The system of claim 26, wherein the means for determining the at least one calibration parameter operates only after the threshold number of different image elements has been projected.

* * * * *